United States Patent
Wu

(10) Patent No.: US 10,715,628 B2
(45) Date of Patent: Jul. 14, 2020

(54) ATTRIBUTE OPERATING METHOD AND DEVICE

(71) Applicant: ZTE CORPORATION, Shenzhen, Guangdong Province (CN)

(72) Inventor: Hao Wu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 4 days.

(21) Appl. No.: 15/308,024

(22) PCT Filed: Jul. 1, 2014

(86) PCT No.: PCT/CN2014/081418
§ 371 (c)(1),
(2) Date: Dec. 1, 2016

(87) PCT Pub. No.: WO2015/168981
PCT Pub. Date: Nov. 12, 2015

(65) Prior Publication Data
US 2017/0085673 A1 Mar. 23, 2017

(30) Foreign Application Priority Data
May 5, 2014 (CN) .......................... 2014 1 0186635

(51) Int. Cl.
*G06F 15/16* (2006.01)
*H04L 29/08* (2006.01)
*H04W 4/70* (2018.01)

(52) U.S. Cl.
CPC .............. *H04L 67/32* (2013.01); *H04L 67/12* (2013.01); *H04W 4/70* (2018.02)

(58) Field of Classification Search
CPC .......... H04L 67/32; H04L 67/12; H04W 4/70; Y04S 40/166; Y04S 40/162
See application file for complete search history.

(56) References Cited

U.S. PATENT DOCUMENTS

2013/0103842 A1* 4/2013 Seed ................... H04L 41/0213
709/227
2013/0179557 A1* 7/2013 Bian ....................... H04L 41/00
709/223

(Continued)

FOREIGN PATENT DOCUMENTS

CN 102104694 A 2/2014
CN 103596117 A 2/2014

(Continued)

OTHER PUBLICATIONS

International Search Report and Written Opinion dated Jan. 28, 2015, for International Application No. PCT/CN2014/081418.

(Continued)

*Primary Examiner* — Benjamin M Thieu
(74) *Attorney, Agent, or Firm* — Cantor Colburn LLP

(57) ABSTRACT

The present document discloses an attribute operating method and device. In the above method, receiving a request message from a sending end, herein, parameter information carried in the request message includes: operating indication information, a resource address to be operated, an information type to be operated, and an information content to be operated; determining to operate on an attribute according to the operation indication information and the information type; and executing an operation corresponding to the attribute by using the resource address and the information content. On the basis of the technical solution provided by the present document, the execution of any attribute operation can be implemented without re-creating resources.

12 Claims, 2 Drawing Sheets

A request message from a sending end is received, herein, parameter information carried in the request message includes: operating indication information, a resource address to be operated, an information type to be operated, and an information content to be operated — S202

It is determined to operate on an attribute according to the operation indication information and the information type — S204

An operation corresponding to the attribute is executed by using the resource address and the information content — S206

(56) References Cited

U.S. PATENT DOCUMENTS

| | | | | |
|---|---|---|---|---|
| 2013/0203394 | A1* | 8/2013 | Dong | H04W 4/70 455/414.1 |
| 2013/0219064 | A1* | 8/2013 | Zhang | H04W 4/00 709/225 |
| 2014/0215043 | A1* | 7/2014 | Ryu | H04W 4/70 709/223 |
| 2014/0330952 | A1* | 11/2014 | Starsinic | H04L 65/1069 709/223 |
| 2015/0009818 | A1* | 1/2015 | Xiao | H04W 4/12 370/230.1 |
| 2015/0029894 | A1* | 1/2015 | Lu | H04W 4/70 370/259 |
| 2015/0074144 | A1 | 3/2015 | Zhang et al. | |
| 2015/0296470 | A1* | 10/2015 | Kim | H04W 4/70 455/435.2 |
| 2015/0350348 | A1* | 12/2015 | Yin | H04W 4/18 709/202 |
| 2016/0088420 | A1* | 3/2016 | Kim | H04W 4/70 370/328 |
| 2016/0112981 | A1* | 4/2016 | Ahn | H04W 4/70 455/500 |
| 2017/0099562 | A1* | 4/2017 | Bhalla | H04W 4/005 |

FOREIGN PATENT DOCUMENTS

| | | |
|---|---|---|
| WO | 2012/109531 A2 | 8/2012 |
| WO | 2014026587 A1 | 2/2014 |
| WO | 2015168981 A1 | 11/2015 |

OTHER PUBLICATIONS

ETSI TS 102 690 (v.2.1.1) Machine-to-Machine Communications (M2M); Functional Architecture, Oct. 2013, sections 9.1.2 and 9.3.2.29 (332pp).

Extended European Search Report dated Apr. 20, 2017 for European Patent Application No. EP14891325.4.

ZTE et al: "This document specifies the functional architecture for oneM2M services platform. This version of the document provides corrections based on review comments for v-o.3.1. Includes some editorial corrections and Rappoteur Input as well over v-0.3.1" ARC-2014-0618R02-Functional_Architecture_Spec_TS-001_V0_ 3_2_Draft-Baseline.Zip, oneM2M, vol. WG2-Architecture, ARC, No. Conference=ARC, No. conference=ARC 8.1, Jan. 12, 2014, pp. 1-171, XP084004483, retrieved for the internet: URL:URL=http://member.oneM2M.org/Application/documentapp/downloadimmediate/default.aspx?docID=4513.

Joerg Swetina et al: "oneM2M-TR-0007-Study_on_Abstraction_ and_Semantics_Enablement", TR-0007-Study_On_Abstraction_ And_Semantics_Enablement-V0_8_0.zip, oneM2M, vol. Work Programme, Work Progr, No. version=v0.8.0 22 Apr. 2014, pp. 1-74, XP084005840, retrieved from the Internet: URL:URL=http://member.onem2m.org/Application/documentapp/downloadimmediate/default.aspx?docID=5985.

Nec et al: "Message flows for AE Recourse", oneM2M-ARC-2013-0410-Message_Flows_For_AE_Resource.doc, oneM2M, vol. WG2—Architecture, ARC Oct. 6, 2013, pp. 1-5, XP084003429, retrieved from the Internet: URL: URL=http://member.oneM2M.org/Application/documentapp/downloadimmediate/default.aspx?docID=3364.

* cited by examiner

ATTRIBUTE OPERATING METHOD AND DEVICE

CROSS-REFERENCE TO RELATED APPLICATION(S)

This application is the U.S. National Phase application of PCT application number PCT/CN2014/081418 having a PCT filing date of Jul. 1, 2014, which claims the priority of Chinese patent application 201410186635.5 filed on May 5, 2014, the entire disclosures of which are incorporated herein by reference.

TECHNICAL FIELD

The present document relates to the field of communication, and in particular to an attribute operating method and device.

BACKGROUND OF RELATED ART

A Machine to Machine (abbreviated as M2M) communication network is composed of various M2M nodes and a bearer network. The M2M nodes communicate with each other through the bearer network, and one M2M node can include but not limited to: an application entity or a common service entity. The application entity is a logic unit which practically executes the M2M application, and the common service entity is a logic unit which performs management and service on the application.

In the M2M system architecture, the application node is an endmost execution node, for example, an intelligent electric meter, a temperature measurement and control sensor, a fire alarm, an intelligent home appliances, etc. While an intermediate node is a middleware which connects the endmost execution node to a network side server, for example, a gateway; the base node is a network side server, herein, the application entity registered on the base node is usually a management software or management platform of the M2M service provider.

FIG. 1 is a schematic diagram of an M2M system architecture based on the existing technology. As shown in FIG. 1, the communication between the M2M applications in general is achieved through the interaction between the Common Service Entities (abbreviated as CSE). While the premise of the communication is that the M2M application first needs to register in the local CSE (for example, the application entity on the application node in FIG. 1 needs to register to the CSE on the intermediate node, then the CSE on the intermediate node is a local CSE of the application entity on the application node), and then the interaction between the M2M applications is achieved through the communication between the local CSEs.

The application node is a physical entity, and the application entity (abbreviated as AE) is a logical unit, which is a logical unit that really executes the application on the application node, that is, the physical entity. The AE can create resources on the local CSE as per requirement, and each resource has a corresponding attribute to identify the characteristics of the resource.

However, in the existing technology, when a resource is created, its attribute is also created synchronically. If it is required to add a new attribute, or delete an existing attribute, then the resource must be first deleted, and then a resource is re-created, and the new attribute is created synchronically when creating the resource, and the attribute which is required to be deleted will be ignored and will not be created again when creating the resource. The reason for using the above operating procedures is that: the existing creation operation can only support the operation on the resource, while not support the operation on the attribute, which leads to that any operation of adding and/or deleting attributes must be completed by re-creating the resource.

It can be seen that the existing technology is short of a technical solution for executing any operation on the attribute without re-creating the resource.

SUMMARY

The embodiment of the present document provides an attribute operating method and device, in order to solve the problem that any operation can not be executed on the attribute without re-creating the resource, in the existing technology.

An attribute operating method is provided according to one embodiment of the present document.

The attribute operating method according to an embodiment of the present document includes: receiving a request message from a sending end, herein, parameter information carried in the request message includes: operating indication information, a resource address to be operated, an information type to be operated, and an information content to be operated; determining to operate on an attribute according to the operation indication information and the information type; and executing an operation corresponding to the attribute by using the resource address and the information content.

Alternatively, the operating indication information is a creating operation, the information type is an attribute type, the resource address is a resource address of an attribute to be added, and the information content is an attribute name and an attribute parameter value of the attribute; and executing an operation corresponding to the attribute by using the resource address and the information content includes: determining that the attribute name is not included in a resource that is indicated by the resource address of the attribute to be added; and creating the attribute in the resource, herein, a name of the attribute is set as the attribute name, and a parameter value of the attribute is set as the attribute parameter value.

Alternatively, the operating indication information is a creating operation, the information type is an attribute type, the resource address is a resource address of an attribute to be added, and the information content is an attribute name and an attribute parameter value of the attribute; and executing an operation corresponding to the attribute by using the resource address and the information content includes: determining that the attribute name is included in a resource that is indicated by the resource address of the attribute to be added; judging whether the attribute is allowed to be created as multiple; if the attribute is allowed to be created as multiple, then creating the attribute in the resource, herein, the name of the attribute is determined according to the attribute name and different with a name that has already existed in the resource and corresponds to the attribute, and the parameter value of the attribute is set as the attribute parameter value; and if the attribute is not allowed to be created as multiple, then returning a response message to the sending end, herein, the response message carries creation failure indication information.

Alternatively, the operating indication information is a deleting operation, the information type is an attribute type, the resource address is a resource address of an attribute to be deleted, and the information content is an attribute name of the attribute; and executing an operation corresponding to the attribute by using the resource address and the information content includes: determining that the attribute name is included in a resource that is indicated by the resource address of the attribute to be deleted; and deleting the attribute in the resource.

Alternatively, the operating indication information is a deleting operation, the information type is an attribute type, the resource address is a resource address of an attribute to be deleted, and the information content is an attribute name of the attribute; and executing an operation corresponding to the attribute by using the resource address and the information content includes: determining that the attribute name is not included in a resource that is indicated by the resource address of the attribute to be deleted; and returning a response message to the sending end, herein, the response message carries deleting failure indication information.

Alternatively, the sending end is one of the following: a common service entity (CSE), and an application entity (AE).

An attribute operating device is provided according to another embodiment of the present document.

The attribute operating device according to an embodiment of the present document includes: a receiving module, arranged to receive a request message from a sending end, herein, parameter information carried in the request message includes: operating indication information, a resource address to be operated, an information type to be operated, and an information content to be operated; a determination module, arranged to determine to operate on an attribute according to the operation indication information and the information type; and an execution module, arranged to execute an operation corresponding to the attribute by using the resource address and the information content.

Alternatively, the operating indication information is a creating operation, the information type is an attribute type, the resource address is a resource address of an attribute to be added, and the information content is an attribute name and an attribute parameter value of the attribute; and the execution module includes: a first determination unit, arranged to determine that the attribute name is not included in a resource that is indicated by the resource address of the attribute to be added; and a creation unit, arranged to create the attribute in the resource, herein, a name of the attribute is set as the attribute name, and a parameter value of the attribute is set as the attribute parameter value.

Alternatively, the operating indication information is a creating operation, the information type is an attribute type, the resource address is a resource address of an attribute to be added, and the information content is an attribute name and an attribute parameter value of the attribute; and the execution module includes: a second determination unit, arranged to determine that the attribute name is included in a resource that is indicated by the resource address of the attribute to be added; a judgment unit, arranged to judge whether the attribute is allowed to be created as multiple; a processing unit, arranged to create the attribute in the resource when the judgment unit outputs YES, herein, a name of the attribute is determined according to the attribute name and different with a name that has already existed in the resource and corresponds to the attribute, and a parameter value of the attribute is set as the attribute parameter value; and a first response unit, arranged to return a response message to the sending end when the judgment unit outputs NO, herein, the response message carries creation failure indication information.

Alternatively, the operating indication information is a deleting operation, the information type is an attribute type, the resource address is a resource address of an attribute to be deleted, and the information content is an attribute name the attribute; and the execution module includes: a third determination unit, arranged to determine that the attribute name is included in a resource that is indicated by the resource address of the attribute to be deleted; and a deleting unit, arranged to delete the attribute in the resource.

Alternatively, the operating indication information is a deleting operation, the information type is an attribute type, the resource address is a resource address of an attribute to be deleted, and the information content is an attribute name of the attribute; and the execution module includes: a fourth determination unit, arranged to determine that the attribute name is not included in a resource that is indicated by the resource address of the attribute to be deleted; and a second response unit, arranged to return a response message to the sending end, herein, the response message carries deleting failure indication information.

The embodiment of the present document adopts receiving a request message from a sending end, herein, parameter information carried in the request message includes: operating indication information, a resource address to be operated, an information type to be operated, and an information content to be operated; determining to operate on an attribute according to the operation indication information and the information type; and executing the operation corresponding to the attribute by using the source address and the information content, which solves the problem that any operation cannot be executed on the attribute without re-creating the resource in the existing technology, and then realizes executing any operation on the attribute without re-creating the resource.

BRIEF DESCRIPTION OF THE DRAWINGS

The accompanying drawings described herein are used to provide further understanding for the present document and constitute a part of the present application. The illustrated embodiments of the present document and the description thereof are used to explain the present document, rather than constituting an inappropriate limitation on the present document. Herein.

SPECIFIED EMBODIMENTS OF THE INVENTION

The present document is described in detail with reference to the accompanying drawings and in combination with embodiments hereinafter. It should be illustrated that, in the case of not conflicting, the embodiments in the present application and features in these embodiments can be combined with each other.

Figure 1:
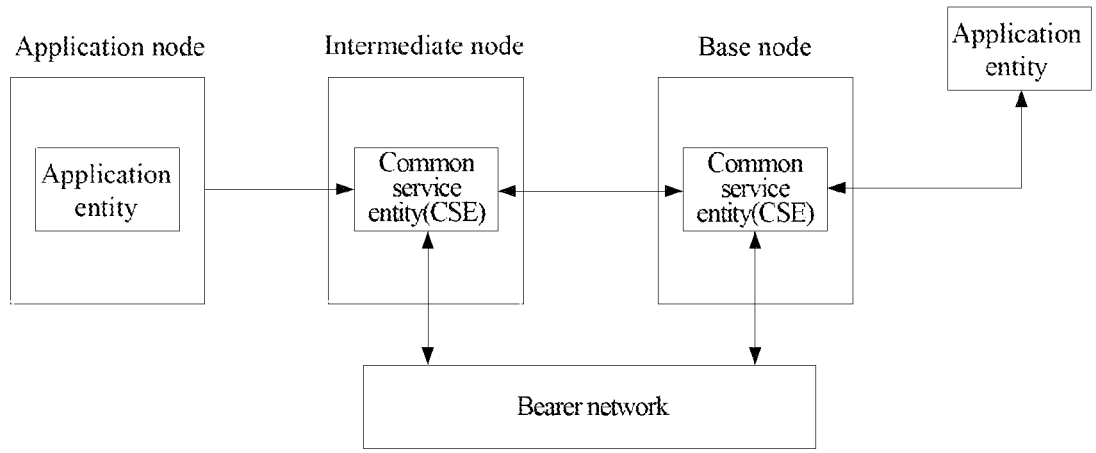
FIG. 1 is a schematic diagram of an M2M system architecture based on the existing technology.
Figure 2:
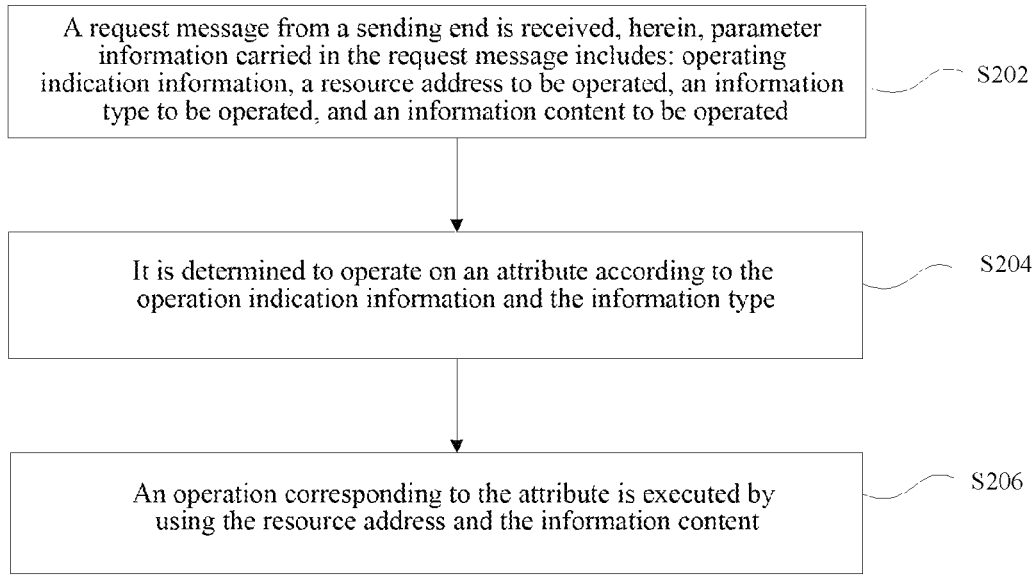
FIG. 2 is a flow chart of an attribute operating method according to an embodiment of the present document.

FIG. 2 is a flow chart of an attribute operating method according to an embodiment of the present document. As shown in FIG. 2, the method can include the following processing steps.

In step S202, a request message from a sending end is received. Herein, parameter information carried in the request message includes: operating indication information, a resource address to be operated, an information type to be operated, and an information content to be operated.

In step S204, it is determined to operate on an attribute according to the operation indication information and the information type.

In step S206, an operation corresponding to the attribute is executed by using the resource address and the information content.

In the existing technology, any operation cannot be executed on the attribute without re-creating the resource. The method as shown in FIG. 2 is adopted to add indication information of executing an operation on the attribute (for example, creating or deleting) in the request message, set the information type as an attribute, resource location information where the attribute to be operated is located, and information content operating on the attribute. Then it can be determined that what is operated currently is the attribute rather than the resource according to the operating indication information and the information type. And then a relevant operation is executed on the above attribute according to the resource location information and the information content.

In an alternative implementation process, the above sending end may include, but not limited to, one of the following:
(1) a common service entity (CSE);
(2) an application entity (AE).

Alternatively, in step S206, the above operating indication information is a creating operation, the information type is an attribute type, the resource address is a resource address of an attribute to be added, and the information content is an attribute name and an attribute parameter value of the attribute. By using the resource address and the information content, executing the operation corresponding to the attribute can include the following operations.

In step S1, it is determined that the attribute name is not included in a resource that is indicated by the resource address of the attribute to be added.

In step S2, the attribute is created in the resource. Herein, a name of the attribute is set as the attribute name, and a parameter value of the attribute is set as the attribute parameter value.

In an alternative embodiment, the sending end sends a creation request to a receiving end, herein, the parameter information carried in the creation request can include but not limited to at least one of the following:
(1) operating indication information, used for indicating to execute an operation, such as, creating, deleting, replacing, and etc., on the attribute;
(2) a resource address of the attribute to be created;
(3) an information type to be created, for example, if it is required to create an attribute, then it needs to set the information type as "attribute";
(4) an information content to be created, for example, if it is required to create an attribute, then it needs to include a name of the attribute and its attribute parameter value.

After the receiving end receives the creation request, if it is determined to indicate to create an attribute according to the operating indication information and the information type to be created, then it is queried whether the attribute name involved in the information content to be created of the above creation request is included in the resource which is indicated by the resource address of the attribute to be created; if not included, then a new attribute is created, and its attribute name and its attribute parameter value can be set as the attribute name and the attribute parameter value carried in the above creation request.

Alternatively, in step S206, the above operating indication information is a creating operation, the information type is an attribute type, the resource address is a resource address of an attribute to be added, and the information content is an attribute name and an attribute parameter value of the attribute; and executing the operation corresponding to the attribute by using the resource address and the information content can include the following steps.

In step S3, it is determined that the attribute name is included in a resource that is indicated by the resource address of the attribute to be added.

In step S4, it is judged whether the attribute is allowed to be created as multiple.

In step S5, if the attribute is allowed to be created as multiple, then the attribute is created in the resource. Herein, a name of the attribute is determined according to the attribute name and different with a name that has already existed in the resource and corresponds to the attribute, and a parameter value of the attribute is set as the attribute parameter value.

In step S6, if the attribute is not allowed to be created as multiple, then a response message is returned to the sending end. Herein, the response message carries creation failure indication information.

In an alternative embodiment, after the receiving end receives the creation request, if it is determined to indicate create an attribute according to the operating indication information and the information type to be created, then it is queried whether the attribute name involved in the information content to be created of the above creation request is included in the resource which is indicated by the resource address of the attribute to be created; if included, then it is judged whether the attribute is allowed to be created as multiple; and if allowed, then another attribute is created, and its attribute name can be set as another name different with the existing attribute name, while the attribute parameter value can be set as the attribute parameter value carried in the above creation request; and if not allowed, then a response message is returned to the sending end, herein, the response message carries creation failure indication information.

As an alternative embodiment of the present document, the sending end can be an AE or a CSE, and the receiving end can be a CSE.

The sending end sends a creation request to the receiving end, herein, the parameter information carried in the creation request can include but not limited to at least one of the following:
(1) operating indication information, used for indicating to execute a creation operation on the attribute;
(2) a resource address of the attribute to be created: CSEroot/application1;
(3) an information type to be created: set as "attribute";
(4) an information content to be created: an attribute name (APP-ID), an attribute parameter value (TV0001).

After the receiving end receives the above creation request, if it is determined to indicate to create an "attribute" according to the information type to be created, then it is queried whether the attribute name "APP-ID" involved in the above creation request is included in the resource "application1" which is indicated by the resource address of the attribute to be created; if not included, then a new attribute is created, and its attribute name is set as "APP-ID" and its attribute parameter value is set as "TV0001"; if included, then it is judged whether the attribute is allowed to be created as multiple; and if allowed, then another attribute is created, and its attribute name can be set as other name "APP-ID[2]" different with the existing attribute name (that is, to add a postfix after the existing same attribute name for distinguishing), while the attribute parameter value can be set as the attribute parameter value "TV0001" carried in the above creation request; and if not allowed, then a response message is returned to the sending end, herein, the response message carries creation failure indication information.

It should be noted that each attribute in the resource can be pre-configured to be with multiplicity, and the multiplicity configuration of the attributes can be divided into the following several types:

(1) 0 . . . 1: representing that this attribute is optional, which can be not included, and only one can be created at most;

(2) 1: representing that this attribute is mandatory, but only one can be created;

(3) 0 . . . n: representing that this attribute is optional, and one or more can be created;

(4) 1 . . . n: representing that this attribute is mandatory, and one or more can be created.

In other words, if the multiplicity of an attribute is defined as 0 . . . n or 1 . . . n, then the attribute is allowed to be created as multiple.

Alternatively, in step S206, the above operating indication information is a deleting operation, the information type is an attribute type, the resource address is a resource address of an attribute to be deleted, and the information content is an attribute name of the attribute; and executing the operation corresponding to the attribute by using the resource address and the information content can include the following operations.

In step S7, it is determined that the attribute name is included in a resource that is indicated by the resource address of the attribute to be deleted.

In step S8, the attribute is deleted in the resource.

In an alternative embodiment, the sending end sends a deleting request to the receiving end, herein, the parameter information carried in the deleting request can include but not limited to at least one of the following:

(1) operating indication information, used for indicating to execute an operation, such as, creating, deleting, replacing, and etc., on the attribute;

(2) a resource address of the attribute to be deleted;

(3) an information type to be deleted, for example, if it is required to deleted an attribute, then it needs to set the information type as "attribute";

(4) an information content to be deleted, for example, if it is required to delete an attribute, then it needs to include a name of the attribute.

After the receiving end receives the above deleting request, if it is determined to indicate to delete an attribute according to the information type to be deleted, then it is queried whether the attribute name involved in the information content to be deleted of the above deleting request is included in the resource which is indicated by the resource address of the attribute to be deleted; if included, then the attribute is deleted directly.

Alternatively, in step S206, the above operating indication information is a deleting operation, the information type is an attribute type, the resource address is a resource address of an attribute to be deleted, and the information content is an attribute name of the attribute; and executing the operation corresponding to the attribute by using the resource address and the information content can include the following steps.

In step S9, it is determined that the attribute name is not included in a resource that is indicated by the resource address of the attribute to be deleted.

In step S10, a response message is returned to the sending end, herein, the response message carries deleting failure indication information.

In an alternative embodiment, after the receiving end receives the above deleting request, if it is determined to indicate to delete an attribute according to the information type to be deleted, then it is queried whether the attribute name involved in the information content to be deleted of the above deleting request is included in the resource which is indicated by the resource address of the attribute to be deleted; if not included, then a response message is returned to the sending end, herein, the response message carries deleting failure indication information.

As another alternative embodiment of the present document, the sending end sends a deleting request to the receiving end, herein, the parameter information carried in the deleting request can include but not limited to at least one of the following:

(1) operating indication information, used for indicating to execute a deleting operation on the attribute;

(2) a resource address of the attribute to be deleted: CSEroot/application1;

(3) an information type to be deleted: set as "attribute";

(4) an information content to be deleted: the attribute name "APP-ID".

After the receiving end receives the above deleting request, if it is determined to indicate to delete an attribute according to the information type to be deleted, then it is queried whether the attribute name "APP-ID" involved in the information content to be deleted of the above deleting request is included in the resource "application1" which is indicated by the resource address of the attribute to be deleted; if included, then the attribute is deleted directly; if not included, then a response message is returned to the sending end, herein, the response message carries deleting failure indication information; in addition, it can set a cause of error, to set the cause of error as "attribute not existing".

Figure 3:
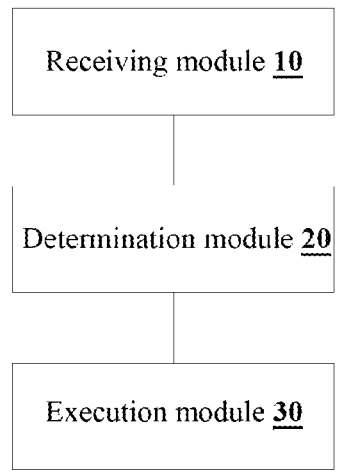
FIG. 3 is a structure block diagram of an attribute operating device according to an embodiment of the present document.

FIG. 3 is a structure block diagram of an attribute operating device according to an embodiment of the present document. As shown in FIG. 3, the attribute operating device can include: a receiving module 10, arranged to receive a request message from a sending end, herein, parameter information carried in the request message includes: operating indication information, a resource address to be operated, an information type to be operated, and an information content to be operated; a determination module 20, arranged to determine to operate on an attribute according to the operation indication information and the information type; and an execution module 30, arranged to execute an operation corresponding to the attribute by using the resource address and the information content.

The method as shown in FIG. 3 is adopted, which solves the problem that any operation can not be executed on the attribute without re-creating the resource in the existing technology, and then realizes executing any operation on the attribute without re-creating the resource.

Figure 4:
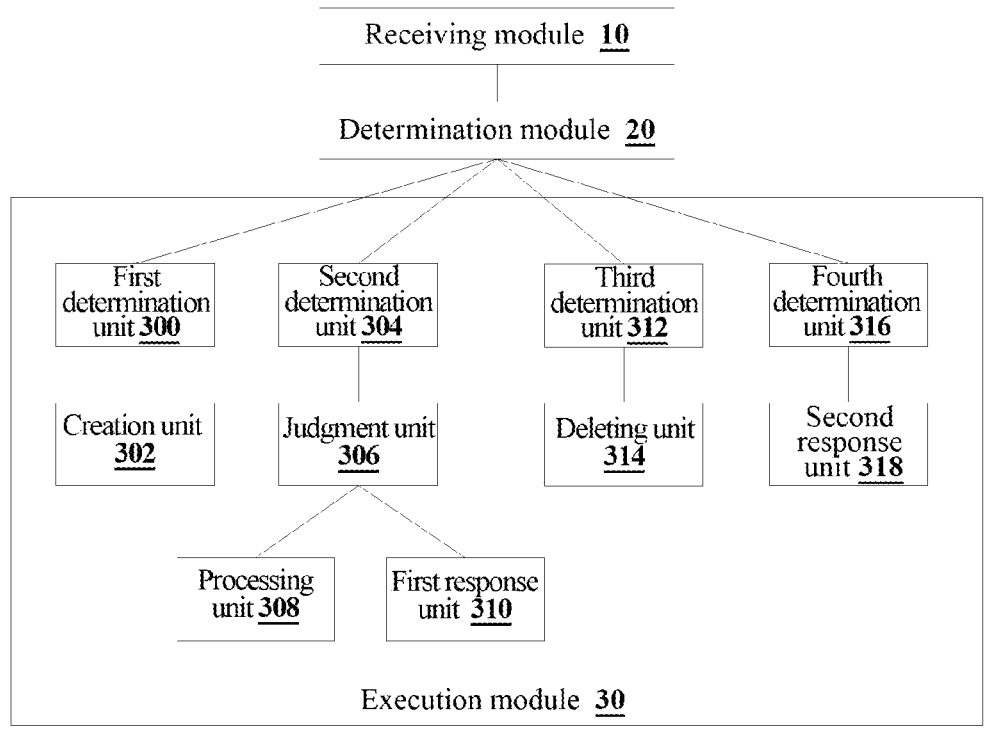
FIG. 4 is a structure block diagram of an attribute operating device according to an alternative embodiment of the present document.

Alternatively, as shown in FIG. 4, the operating indication information is a creating operation, the information type is an attribute type, the resource address is a resource address of an attribute to be added, and the information content is an attribute name and an attribute parameter value of the attribute; and the execution module 30 can include: a first determination unit 300, arranged to determine that the attribute name is not included in a resource that is indicated by the resource address of the attribute to be added; and a creation unit 302, arranged to create the attribute in the resource, herein, a name of the attribute is set as the attribute name, and a parameter value of the attribute is set as the attribute parameter value.

Alternatively, as shown in FIG. 4, the operating indication information is a creating operation, the information type is an attribute type, the resource address is a resource address of an attribute to be added, and the information content is an attribute name and an attribute parameter value of the attribute; and the execution module 30 can include: a second determination unit 304, arranged to determine that the attribute name is included in a resource that is indicated by the resource address of the attribute to be added; a judgment unit 306, arranged to judge whether the attribute is allowed to be created as multiple; a processing unit 308, arranged to create the attribute in the resource when the judgment unit outputs YES, herein, a name of the attribute is determined according to the attribute name and different with a name that already existed in the resource and corresponding to the attribute, and a parameter value of the attribute is set as the attribute parameter value; and a first response unit 310, arranged to return a response message to the sending end when the judgment unit outputs NO, herein, the response message carries creation failure indication information.

Alternatively, as shown in FIG. 4, the operating indication information is a deleting operation, the information type is an attribute type, the resource address is a resource address of an attribute to be deleted, and the information content is an attribute name of the attribute; and the execution module 30 can include: a third determination unit 312, arranged to determine that the attribute name is included in a resource that is indicated by the resource address of the attribute to be deleted; and a deleting unit 314, arranged to delete the attribute in the resource.

Alternatively, as shown in FIG. 4, the operating indication information is a deleting operation, the information type is an attribute type, the resource address is a resource address of an attribute to be deleted, and the information content is an attribute name of the attribute; and the execution module 30 can include: a fourth determination unit 316, arranged to determine that the attribute name is not included in a resource that is indicated by the resource address of the attribute to be deleted; and a second response unit 318, arranged to return a response message to the sending end, herein, the response message carries deleting failure indication information.

From the above description, it can be seen that the above embodiments achieve the following technical effects (it needs to be explained that these effects are effects that some of the preferable embodiments can achieve): by adopting the technical solution provided by the embodiment of the present document, the execution of any operation on attribute can be implemented without re-creating resources. Thus, it is extended from only executing the relevant operation on the resources, which is existed in the existing technology, to not only executing the relevant operation on the resource but also executing the relevant operation on the attribute, and then enables the configuration mode much more flexible and diverse.

Obviously, it can be understood by those skilled in the art that each module or each step above-mentioned in the present document can be implemented by the universal calculating device, and they can be integrated in a single calculating device, or distributed in the network made up by a plurality of calculating device. Alternatively, they can be implemented by the executable program codes of the calculating device. Accordingly, they can be stored in the storage device and implemented by the calculating device, and in some situation, the shown or described steps can be executed according to a sequence different from this place, or they are made into each integrated circuit module respectively, or a plurality of modules or steps therein are made into the single integrated circuit module to be implemented. In this way, the present document is not limit to any specific form of the combination of the hardware and software.

The above description is only the preferred embodiments of the present document and is not intended to limit the present document. For those skilled in the art, the present document can have various modifications and variations. All of modifications, equivalents and/or variations without departing from the rule and essence of the present document should be embodied in the scope of the appended claims of the present document.

INDUSTRIAL APPLICABILITY

The above technical solution provided by the present document can be applied in the process of operating the attribute, and a request message from a sending end is received, herein, parameter information carried in the request message includes: operating indication information, a resource address to be operated, an information type to be operated, and an information content to be operated; it is determined to operate on an attribute according to the operation indication information and the information type; and the operation corresponding to the attribute is executed by adopting the source address and the information content, which solves the problem that any operation can not be executed on the attribute without re-creating the resource in the existing technology, and then realizes executing any operation on the attribute without re-creating the resource.

What is claimed is:

1. An attribute operating method, comprising:
receiving a request message from a sending end, wherein, parameter information carried in the request message comprises: operating indication information, a resource address to be operated, an information type to be operated, and an information content to be operated;
determining to operate on an attribute according to the operation indication information and the information type in the request message; and
executing an operation corresponding to the attribute by using the resource address and the information content in the request message, wherein the information type is an attribute type used for indicating that an object of the operation is an attribute, the operating indication information indicates to create the attribute or delete the attribute in a resource indicated by the resource address;
wherein, the resource address is a resource address of an attribute to be added, and the information content is an attribute name and an attribute parameter value of the attribute; and executing an operation corresponding to the attribute by using the resource address and the information content comprises:
determining that the attribute name is included in a resource that is indicated by the resource address of the attribute to be added;
judging whether the attribute is allowed to be created as multiple;
if the attribute is allowed to be created as multiple, then creating the attribute in the resource, wherein, a name of the attribute is determined according to the attribute name and different with a name that has already existed in the resource and corresponds to the attribute, and a parameter value of the attribute is set as the attribute parameter value; and if the attribute is not allowed to be created as multiple, then returning a response message to the sending end, wherein, the response message carries creation failure indication information.

2. The method according to claim 1, wherein, executing an operation corresponding to the attribute by using the resource address and the information content comprises:

determining that the attribute name is not included in a resource that is indicated by the resource address of the attribute to be added; and creating the attribute in the resource, wherein, a name of the attribute is set as the attribute name and a parameter value of the attribute is set as the attribute parameter value.

3. The method according to claim 2, wherein, the sending end is one of the following: a common service entity CSE, and an application entity AE.

4. The method according to claim 1, wherein, when the resource address is a resource address of an attribute to be deleted, and the information content is an attribute name of the attribute; and executing an operation corresponding to the attribute by using the resource address and the information content comprises:

determining that the attribute name is included in a resource that is indicated by the resource address of the attribute to be deleted; and deleting the attribute in the resource.

5. The method according to claim 4, wherein, the sending end is one of the following: a common service entity CSE, and an application entity AE.

6. The method according to claim 1, wherein, when the resource address is a resource address of an attribute to be deleted, and the information content is an attribute name of the attribute; and executing an operation corresponding to the attribute by using the resource address and the information content comprises:

determining that the attribute name is not included in a resource that is indicated by the resource address of the attribute to be deleted; and returning a response message to the sending end, wherein, the response message carries deleting failure indication information.

7. The method according to claim 6, wherein, the sending end is one of the following: a common service entity CSE, and an application entity AE.

8. The method according to claim 1, wherein, the sending end is one of the following: a common service entity CSE, and an application entity AE.

9. An attribute operating device, comprising a memory storing instructions and a processor which executes the instruction in the memory to:

receive a request message from a sending end, wherein, parameter information carried in the request message comprises: operating indication information, a resource address to be operated, an information type to be operated, and an information content to be operated;

determine to operate on an attribute according to the operation indication information and the information type in the request message; and execute an operation corresponding to the attribute by using the resource address and the information content in the request message, wherein the information type is an attribute type used for indicating that an object of the operation is an attribute, the operating indication information indicates to create the attribute or delete the attribute in a resource indicated by the resource address;

wherein, the resource address is a resource address of an attribute to be added, and the information content is an attribute name and an attribute parameter value of the attribute; and the processor is arranged to:

determine that the attribute name is included in a resource that is indicated by the resource address of the attribute to be added;

judge whether the attribute is allowed to be created as multiple;

create the attribute in the resource when the judgment unit outputs YES, wherein, a name of the attribute is determined according to the attribute name and different with a name that has already existed in the resource and corresponds to the attribute, and a parameter value of the attribute is set as the attribute parameter value; and return a response message to the sending end when the judgment unit outputs NO, wherein, the response message carries creation failure indication information.

10. The device according to claim 9, wherein, the processor is arranged to:

determine that the attribute name is not included in a resource that is indicated by the resource address of the attribute to be added; and create the attribute in the resource, wherein, a name of the attribute is set as the attribute name and a parameter value of the attribute is set as the attribute parameter value.

11. The device according to claim 9, wherein, when the resource address is a resource address of an attribute to be deleted, and the information content is an attribute name of the attribute; and the processor is arranged to:

determine that the attribute name is included in a resource that is indicated by the resource address of the attribute to be deleted; and delete the attribute in the resource.

12. The device according to claim 9, wherein, when the resource address is a resource address of an attribute to be deleted, and the information content is an attribute name of the attribute; and the processor is arranged to:

determine that the attribute name is not included in a resource that is indicated by the resource address of the attribute to be deleted; and return a response message to the sending end, wherein, the response message carries deleting failure indication information.

* * * * *